E. LOUCHE.
GAS TURBINE.
APPLICATION FILED MAR. 22, 1916.

1,250,196.

Patented Dec. 18, 1917
4 SHEETS—SHEET 2.

Inventor:
Emile Louche
by
Attorney

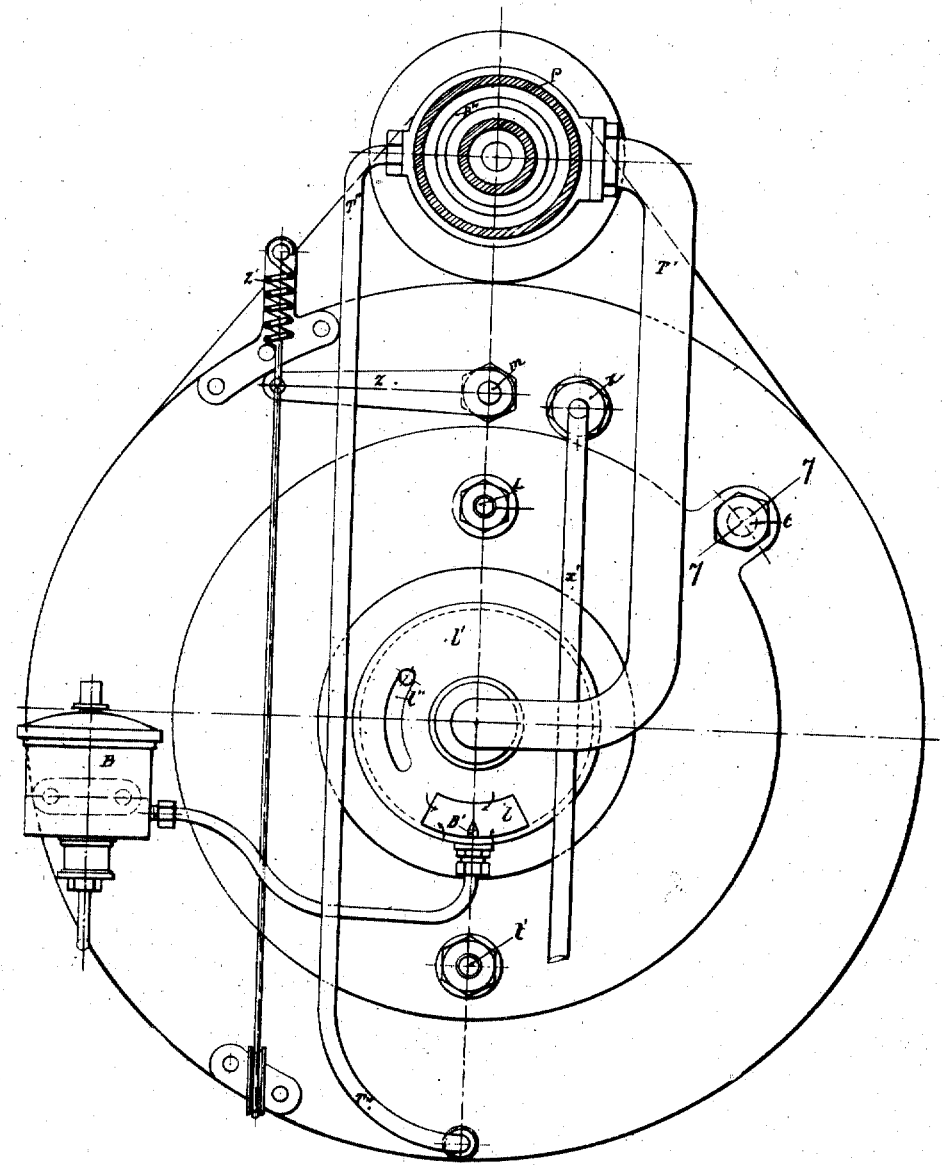
FIG_4_

E. LOUCHE.
GAS TURBINE.
APPLICATION FILED MAR. 22, 1916.
1,250,196.
Patented Dec. 18, 1917.
4 SHEETS—SHEET 4.
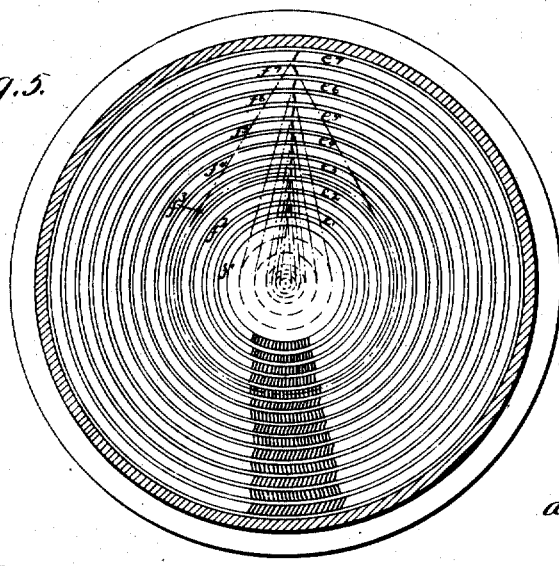
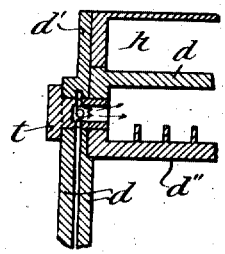
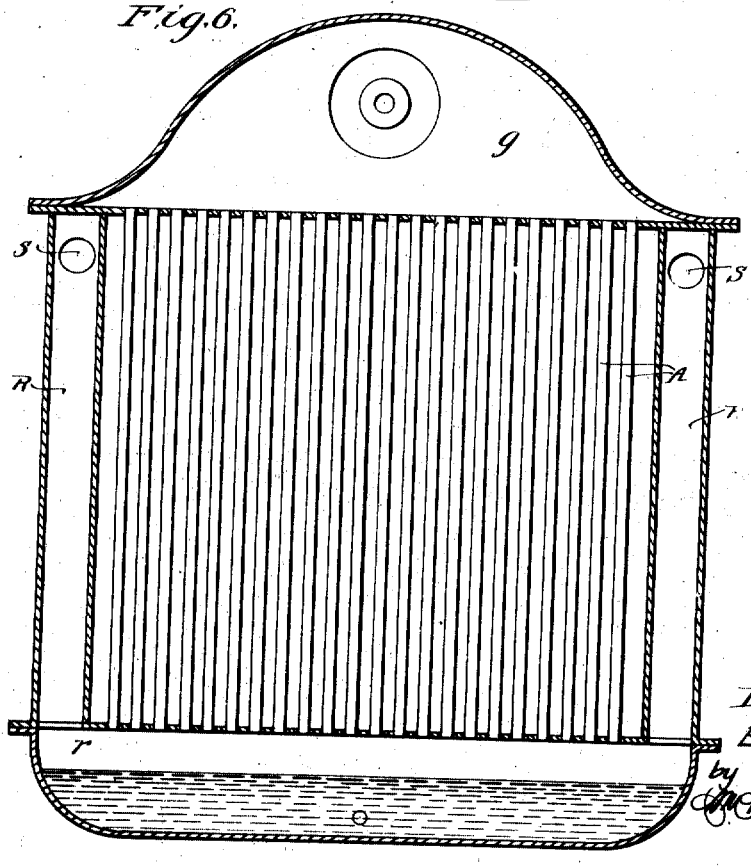
Inventor:
Emile Louche
by
Attorney.

UNITED STATES PATENT OFFICE.

EMILE LOUCHE, OF BOULOGNE-SUR-MER, FRANCE.

GAS-TURBINE.

1,250,196.    Specification of Letters Patent.    Patented Dec. 18, 1917.

Application filed March 22, 1916. Serial No. 85,781.

*To all whom it may concern:*

Be it known that I, EMILE LOUCHE, citizen of the Republic of France, residing at 75 Rue Faidherbe, Boulogne-sur-Mer, Pas de Calais, in the Republic of France, have invented new and useful Improvements in Gas-Turbines, of which the following is a specification.

This invention relates to a turbine which utilizes a mixture of steam and products of combustion from any liquid fuel for the purpose of producing motive power. The turbine is particularly constructed with the view of obtaining a light and compact motor applicable namely to automobiles and to all other industrial purposes.

The annexed drawings illustrate by way of example one form of construction of a turbine incorporating the present invention.

Fig. 4 is a cross section on line 4—4 of Fig. 1;

Fig. 5 is a cross section on line 5—5 of Fig. 1;

Fig. 6 is a cross section on line 6—6 of Fig. 1.

Fig. 7 is a cross-section on line 7—7 of Fig. 4.

Figure 3:
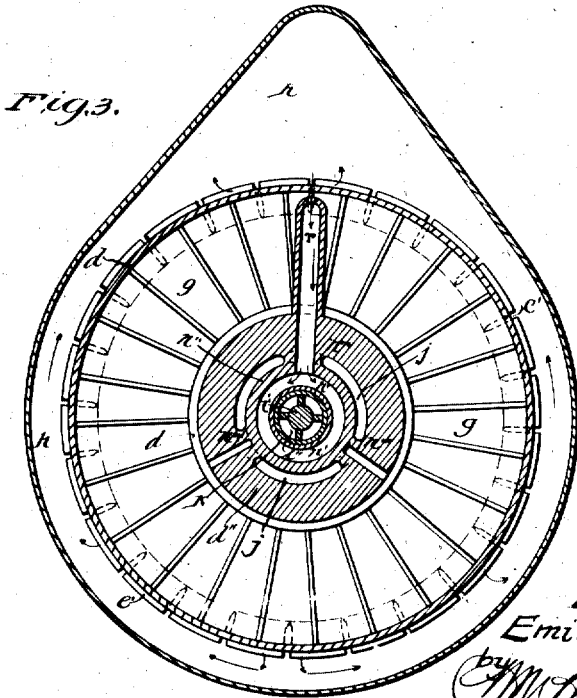
Fig. 3 is a cross section on line 3—3 of Fig. 1.

Referring to the drawings, the turbine comprises a movable wheel $a$ (Fig. 1) keyed on the shaft $b$ and rotating in a casing formed of a shell $d$ cast together with another shell $c$ and united to the latter by means of ribs $c'$ (Fig. 3).

A plate $c''$ bolted on $c$ closes the casing and serves as a support for two ball bearings $b'$ and $b''$ upon which rotates the shaft $b$.

The empty space existing around the shaft $b$ serves as a grease box. The lubricating matter is introduced through an opening closed by a screw plug. The grease box is hermetically closed by the plates $c''$ and $c'''$.

A fly wheel D keyed upon the shaft $b$ is adapted to receive the clutch plate when the turbine is used in an automobile.

Figure 1:
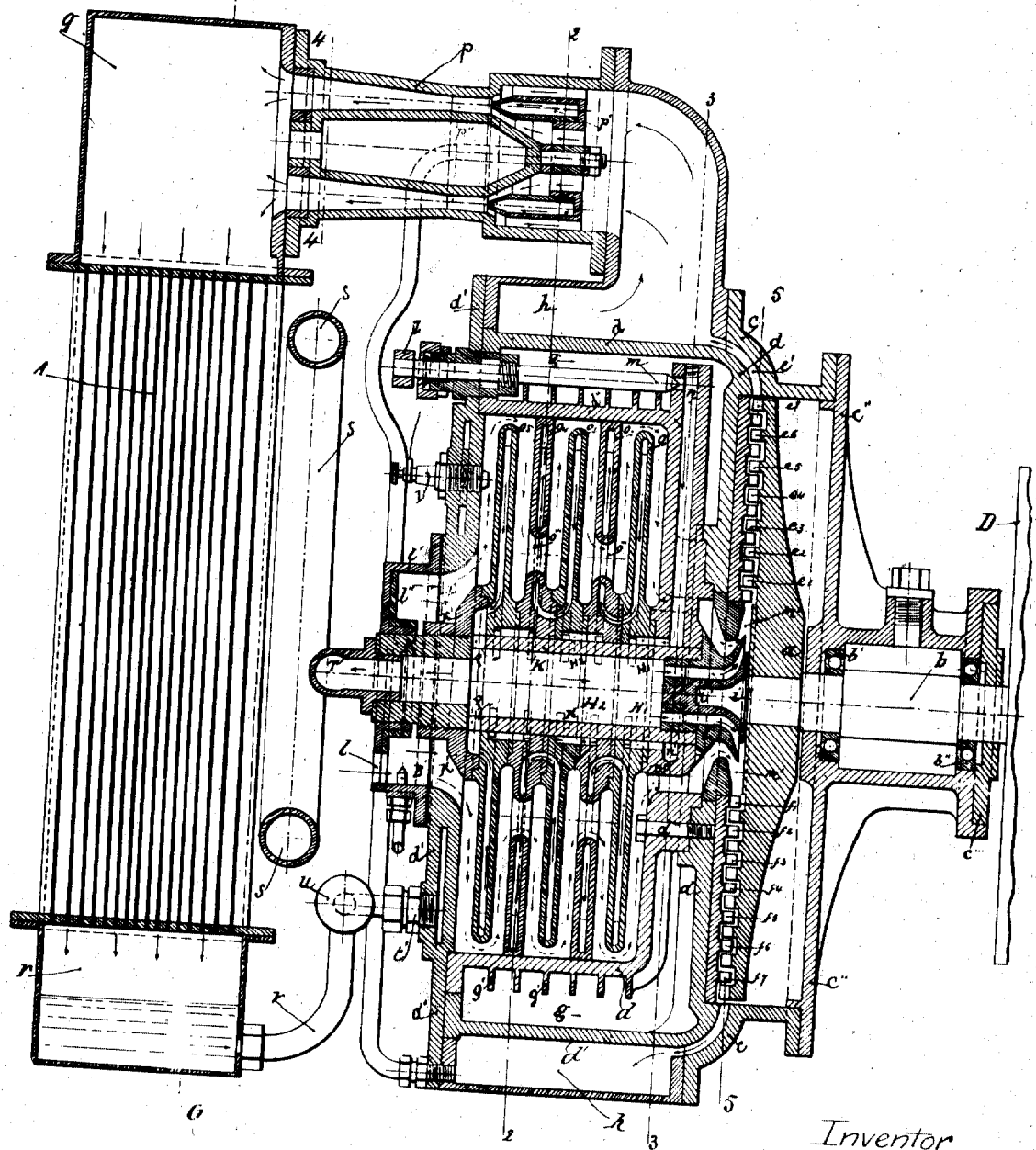
Figure 1 is a vertical section of the turbine through its axis.

A chamber $g$ (Figs. 1, 2 and 3) hermetically closed by a joint plate $d'$ is formed by the empty space existing between the two shells $d$ and $d''$ united together by means of bolts $d'''$ (Fig. 1). This chamber in which water can be introduced constitutes a steam boiler heated by motor fuel as will be hereinafter described. The central part between the shell $d''$ and the plate $d'$ constitutes the combustion chamber. Six annular ribs $g'$ surround the chamber with the view of augmenting the heating surface. The joint plate $d'$ is hollow in its section corresponding to that of the combustion chamber. In this chamber are arranged five hollow plates $o^1$ $o^2$ $o^3$ $o^4$ $o^5$ fitted one into each other and through the interior of which passes steam. They are traversed centrally by a hollow axle K. At one of the ends of this axle is screwed a nozzle formed of two pieces $i$ and $i'$ leaving between them an annular space $i''$ and ended by a mouth having the form of a horn (Fig. 1). This arrangement has for its object to attenuate the thrust exerted upon the wheel $a$ by the steam current issuing from the nozzle.

The shell $d''$ comprises a tubular passage $n$ (Figs. 1 and 3) for supply of steam at the top part of the boiler $g$. This tubular passage leads to the central annular part $n'$ which is surrounded by a crown $n''$ cast with the shell $d''$ by means of three hollow ribs $n'''$ (Fig. 3). The free space $j$ between $n'$, $d''$ and the ribs $n'''$ is provided for the passage of the combustion gases (Figs. 1 and 3).

The joining of the hollow plates $o^1$ to $o^5$ with the boiler $g$ is made on the crown $n''$ by means of a shoulder provided on the nozzle $i$ screwed in the axle K and is secured by the fastening nut K' screwed at the opposite end of the axle K. The plates $o^1$ to $o^5$ being joined and the nut K' fastened, there exists between the channel $n$ and the interior of the axle K a continuous tight duct for the steam having no communication with the combustion chamber in which are located the plates.

Figure 2:
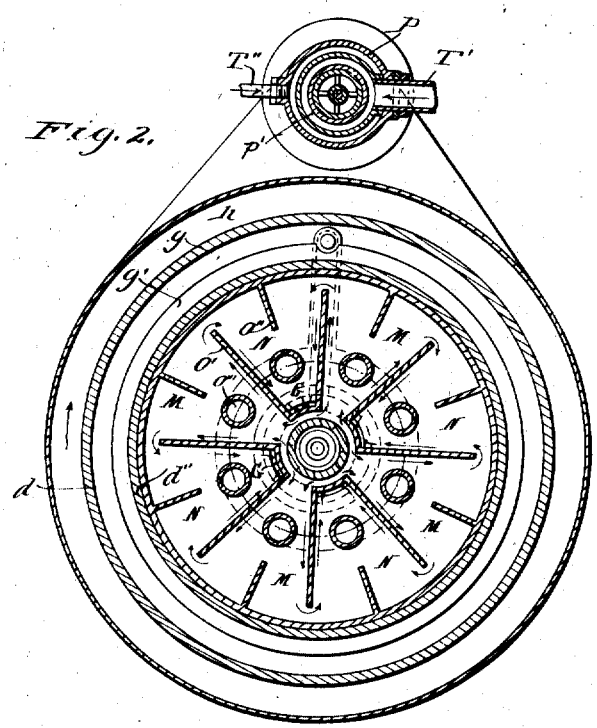
Fig. 2 is a cross section on line 2—2 of Fig. 1.

Fig. 2 is a cross section made through the axis of the plate $o^4$ (Fig. 1) in which are seen the ribs $o'$ and $o''$ cast together with the side walls of the plate as well as the openings $o'''$ which traverse the plates $o^2$ and $o^4$. These two plates occupy the whole section of the combustion chamber while the plates $o^1$, $o^3$ and $o^5$ leave a free space between their external diameter and the cylindrical wall of the combustion chamber and have no openings $o'''$. This free space around $o^1$, $o^3$ and $o^5$ and the openings $o'''$ of the plates $o^2$ and $o^4$ are adapted to let the combustion gases pass through. With the exception of this special feature, the five plates are constructed in the same manner.

The steam is admitted in the channel $n$ by the needle valve $m$ operated by the handle $z$ (Figs. 1 and 4) and is directed toward $n'$ and then to the annular part $H^1$ around the axle K and passes from there to the four sections M of the plate $o^1$, then to the four sections N of the same plate from whence it flows through the four ports G to the next plate $o^2$. From these ports the steam is first admitted to the four sections N then to the four sections M of the plate $o^2$ and goes back to the central part $H^2$. The steam passes thus through the five plates and arrives in the hollow axle K through the ports P. It follows the way illustrated by the full line arrows while the combustion gases travel in the direction illustrated by the dotted line arrows.

The steam admitted in the interior of the axle K is directed on the one hand toward the wheel $a$ by the nozzle $i$ $i'$ and on the other hand toward an ejector $p$ by means of a pipe T'.

This ejector is composed 1st of an annular nozzle $p'$ into which is introduced the steam arriving from the pipe T' 2nd of a mixing chamber $p''$ extended in an annular divergent tube the arrangement of which is illustrated in Figs. 1, 2 and 4.

The ejector is intended to produce a depression in the chamber of the turbine by sucking the mixture of the burnt gases and steam and by forcing said mixture into the chamber $q$ of a surface condenser.

The speed of the steam flowing out of the nozzle $p'$ allows of obtaining a greater depression around the nozzle than in the chamber $h$ which has a much larger section, whereby the condensed water at the bottom of the chamber $h$ can be sucked by the pipe T'' (Fig. 4) and forced to the condenser.

When the turbine is to be operated by means of a liquid fuel such as gasolene, petrol, benzol, etc., the fuel is introduced into a constant level carbureter B (Fig. 4) and distributed therefrom to a sprayer or atomizer B'.

The air required for the combustion arrives at the burner through an opening $l$ provided in one section of the casing $l'$ secured with screws to the plate $d'$. A revolving damper $l''$ pivoted about the axle K allows of controlling at will the admission of air.

The ignition of the carbureted mixture is performed in the combustion chamber by means of an electric ignition device composed of a platinum wire red heated by an electric current and supported in a plug L screwed in the plate $d'$.

A wire gauze L' is secured between the casing $l'$ and the plate $d'$ to prevent the flames from propagating, outside the combustion chamber to the atomizer B'.

The wheel $a$ is composed of a series of concentric crowns of motor blades $e^1$, $e^2$, $e^3$, $e^4$, $e^5$, $e^6$, $e^7$ (Figs. 1 and 5) cut with a mill in the mass of metal. These crowns of blades rotate within another series of concentric crowns of distributing blades $f^1$ to $f^7$ cut in the same manner out of a plate secured to the shell $d$.

The tracing of the blades is illustrated in Fig. 5 in which it may be seen that the blades have a tangential direction to a series of concentric circumferences the diameters of which augment as the crowns of blades are more remote from the axle of the wheel. Each crown of distributing blades has the same inclination to the radius as the corresponding crown of motor blades.

The mixture of steam and burnt gases which arrives at the center of the wheel with great speed and which is directed according to radius, traverses the first crown of distributing blades $f^1$, then acts upon the first crown of motor blades $e^1$ yielding thereto a part of its speed. The mixture then traverses the second crown of distributing blades $f^2$, a little more inclined on the radius than the first ones, and exerts its action on the second crown of motor blades $e^2$ to which it yields another part of its speed. The mixture thus traverses successively the whole series of crowns of blades and flows out by the channel $e'$ to the chamber $h$ after having transmitted to the wheel $a$ the greatest part of its speed.

The direction of flow of the mixture at the outlet of the wheel is brought to a radial direction by the ribs $c'$ (Fig. 3) which unite together the shells $c$ and $d$ (Fig. 1) and provide the space which forms the channel $e'$.

The working of the turbine is performed in the following manner:

The electric current is established through the igniting device by means of a switch within the reach of the chauffeur. The liquid fuel introduced by the atomizer B' flows first in the combustion chamber and is ignited by its contact with the incandescent platinum wire. The small quantity of water which is in the hollow part of the plate $d'$ vaporizes rapidly under the action of the heat and the steam is emitted from a port $t$ (Fig. 4) situated above the water level in the boiler $g$. The port $t$ is adapted to put the hollow part of plate $d'$ in communication with the boiler $g$ (Fig. 7) by means of the hollow screw-plug connecting the plates $d'$ and the shells $d$ and $d''$ together.

The needle-valve $m$ which is kept on its seat by the spring $z'$ acting upon the handle $z$ is then slightly opened. A certain quantity of saturated steam enters the channel $n$ traverses the series of the hollow plates $o^1$ to $o^5$ and arrives at the nozzle $i\ i''$, and by the pipe T' at the nozzle $p'$ of the ejector $p$. A suction is then produced in the combustion chamber and the air enters the casing $l'$ through the opening $l$ carbureting itself by the contact with the fuel which flows from the atomizer B'. The carbureted mixture passes through the wire gauze L' and enters then into the combustion chamber where it ignites. The burnt gases follow then the path illustrated by the dotted line arrows while the steam travels in the opposite direction shown by the full line arrows in the interior of the plates. As seen in Fig. 1, the gases pass first about the plate $o^5$, traverse then the plate $o^4$ through the openings $o'''$, pass about the plate $o^3$, traverse the plate $o^2$, pass about the plate $o^1$ and arrive by the channels $j$ in contact with the steam flowing out from the nozzle $i\ i'$. During this passage of the two fluids, the gases yield a part of their heat to the steam which arrives thus at the nozzles highly superheated under a constant pressure which is that of the boiler $g$.

Owing to the small volume of the boiler $g$ and to the considerable number of calories yielded by the combustion gases, the normal pressure in the boiler is reached rapidly.

The superheated steam conducted from the pipe T' to the nozzle $p'$ of the ejector $p$ flows out from this nozzle with a great speed which depends upon the pressure in the boiler and upon the temperature yielded by the combustion gases. It drives along with it the mixture of gas and steam forced to the chamber $h$ by the jet of superheated steam flowing out from the nozzle $i\ i'$ and it forces this mixture into the upper chamber $q$ of the condenser. The mixture traverses then the tubular bundle A of the condenser. During this passage the steam is condensed and gathered at the lower part of the condenser in the chamber $r$.

The carbonic acid produced by the combustion is expelled to the atmosphere by the side passages R and the connection pipe S (Fig. 6).

The condensed water is taken up from the chamber $r$ by means of an injector $u$ through the suction pipe V and forced to the boiler at $t$ after having passed through the hollow plate $d'$ into which it penetrates at $t'$. The injector $u$ is fed by the saturated steam of the boiler taken up from $x$ through the pipe $x'$ (Fig. 4).

By sucking the mixture of gas and steam in the chamber $h$ the ejector $p$ produces a certain depression in this chamber as well as in the chamber in which rotates the wheel $a$. On the other hand the superheated steam which flows out through the nozzle $i\ i''$ has a speed which is so much the greater the higher the temperature of the steam, and the depression is greater in the chamber of the wheel $a$. This speed causes a further depression in the mixing space $m'$ where the combustion gases and the superheated steam meet. The speed of the gases flowing into the mixing space is also so much the greater the higher the temperature of the gases and the greater the difference of pressure between the combustion chamber and the mixing space $m'$. If the damper $l''$ is wide open for the passage of air, the pressure in the combustion chamber is substantially equal to that of the atmosphere. In dropping down from the atmospheric pressure to the depression existing in the chamber of the wheel $a$ the gases are cooled. The same thing happens in connection with the superheated steam dropping down from the pressure of the boiler to said depression. The mixture of these two fluids can therefore traverse the crowns of blades at a temperature supportable for the metal.

By the control of the air admitted in the combustion chamber by means of the damper $l''$, the highest temperature possible can be obtained in this chamber though it is supportable for the metal in contact with the gases.

On the other hand by opening more or less the needle valve $m$ the necessary quantity of saturated steam can be admitted to obtain its superheating to a determined temperature.

The combination of these two controlling methods allows consequently of controlling the temperature of the gases and that of the superheated steam so as to cause them to flow into the mixing space $m'$ with substantially equal speeds. The loss of kinetic energy resulting from the union of the two fluid streams is thus reduced to a minimum and theoretically should be null. The kinetic energy of the burnt gases is added to that of the superheated steam which results in a very high thermic efficiency.

Having thus described my invention, what I claim as new and desire to secure Letters Patent is:

1. A turbine actuated by a mixture of steam and products of combustion from any liquid fuel comprising in combination a combustion chamber, means for leading into said chamber the liquid fuel and air required for the combustion, means for igniting the liquid fuel, a boiler arranged about the combustion chamber, a wheel provided with motor blades, a plate provided with distributing blades opposite the motor blades, a nozzle arranged at the outlet end of the steam and combustion gases, a mixing space arranged about said nozzle into which lead the steam and combustion gases flowing out of the nozzle, an annular chamber surrounding the boiler into which flows the mixture of steam and burnt gases after having acted upon the motor blades of the wheel, and a condenser connected to the annular chamber and in which the steam is adapted to be condensed while the combustion gases escape therefrom to the atmosphere, substantially as described and for the purpose set forth.

2. A turbine actuated by a mixture of steam and products of combustion from any liquid fuel comprising in combination a combustion chamber, means for leading into said chamber the liquid fuel and air required for the combustion, means for igniting the liquid fuel, a boiler arranged about the combustion chamber; hollow plates fitted one into each other in the interior of the combustion chamber, and arranged so that their hollow spaces communicate successively one with each other, a hollow axle upon which said hollow plates are fitted and communicating with the interior of these plates, a nozzle fixed at the end of the hollow axle and formed of two mouth pieces leaving between them an annular space communicating with the interior of said axle, a tubular passage for the supply of steam communicating with the interior of the hollow plates, a wheel provided with motor blades, a plate provided with distributing blades opposite the motor blades, a mixing space arranged about the said nozzle, an annular chamber surrounding the boiler, and a condenser connected to the annular chamber and provided with passages for the expulsion of the combustion gases to the atmosphere, substantially as described and for the purpose set forth.

3. A turbine actuated by a mixture of steam and products of combustion from any liquid fuel comprising in combination a combustion chamber, means for leading into said chamber the liquid fuel and air required for the combustion, means for igniting the liquid fuel, a boiler arranged about the combustion chamber, hollow plates fitted one into each other in the interior of the combustion chamber, and arranged so that their hollow spaces communicate successively one with each other, a hollow axle upon which said hollow plates are fitted and communicating with the interior of these plates, a nozzle fixed at the end of the hollow axle and formed of two mouth pieces leaving between them an annular space communicating with the interior of said axle, a tubular passage for the supply of steam communicating with the interior of the hollow plates, a wheel provided with a series of concentric crowns of motor blades having a tangential direction to a series of concentric circumferences the diameters of which augment as the crowns of blades are more remote from the axle of the wheel, a plate provided with a series of concentric crowns of distributing blades corresponding to the crowns of motor blades, said distributing blades having the same inclination on the radius as the corresponding motor blades, a mixing space arranged about the said nozzle and leading to the first crown of distributing blades, an annular chamber surrounding the boiler, and a condenser connected to the annular chamber and provided with passages for the expulsion of the combustion gases to the atmosphere, substantially as described and for the purpose set forth.

4. A turbine actuated by a mixture of steam and products of combustion from any liquid fuel comprising in combination a combustion chamber, an atomizer for leading into said chamber the liquid fuel, a damper for controlling the admission of air into said chamber, an igniting device in said chamber, a boiler arranged about the combustion chamber; a wheel provided with motor blades, a plate provided with distributing blades opposite the motor blades, a nozzle arranged at the outlet end of the steam and combustion gases, a mixing space arranged about said nozzle, an annular chamber surrounding the boiler, an ejector connected to said annular chamber, a pipe leading steam from the boiler to the ejector and a surface condenser connected to the ejector and provided with passages for the expulsion of the combustion gases to the atmosphere, substantially as described and for the purpose set forth.

5. A turbine actuated by a mixture of steam and products of combustion from any liquid fuel comprising in combination a combustion chamber, an atomizer for leading into said chamber the liquid fuel, a damper for controlling the admission of air into said chamber, an igniting device in said chamber, a boiler arranged about the combustion chamber, a plate closing one end of the combustion chamber and of the boiler and provided in the section corresponding to the combustion chamber with a hollow space into which water is admitted, said hollow space communicating by a port with the interior of the boiler, a wheel provided with a series of concentric crowns of motor blades, a plate provided with a series of corresponding concentric crowns of distributing blades within which rotate the corresponding crowns of motor blades, a nozzle arranged at the outlet end of the steam and combustion gases, a mixing space arranged about the said nozzle and leading to the first crown of distributing blades, an annular chamber surrounding the boiler, an ejector connected to said annular chamber and formed of an annular nozzle and a mixing device, a pipe leading steam from the boiler to the ejector, a surface condenser connected to the ejector and provided with passages for the expulsion of the combustion gasses to the atmosphere and a pipe provided with an injector connecting the lower part of the condenser to the hollow plate closing the boiler, substantially as described and for the purpose set forth.

6. A turbine actuated by a mixture of steam and products of combustion from any liquid fuel comprising in combination a casing provided with an atomizer for the admission of fuel and with a damper for the admission of air, a wire gauze closing said box opposite the damper, a combustion chamber, an igniting device in said chamber, a boiler arranged about the combustion chamber, hollow plates fitted one into each other in the interior of the combustion chamber, provided inwardly with baffle ribs and arranged so that their hollow spaces communicate successively one with each other, a hollow axle upon which said hollow plates are fitted communicating with the interior of the hollow plates, a nozzle screwed at one end of the hollow axle and formed of two horn shaped mouth pieces, a tubular passage for the supply of steam to the hollow plates, a wheel provided with a series of concentric crowns of motor blades, a plate provided with a series of corresponding concentric crowns of distributing blades, a mixing space arranged about the said nozzle, an annular chamber surrounding the boiler an ejector connected to said annular chamber, a pipe connecting the bottom of said annular chamber to the ejector, a pipe extending from the other end of the hollow axle to the ejector, and a surface condenser provided with passages leading to a connecting pipe for the expulsion of the combustion gases, substantially as described and for the purpose set forth.

In testimony whereof I have signed my name to this specification in the presence of two subscribing witnesses.

EMILE LOUCHE.

Witnesses:
WILLIAM A. BOWLEY,
WILLIAM WHITMAN.